ANTHELMINTIC COMPOSITIONS CONTAINING SUBSTITUTED STYRYLPYRIDINIUM COMPOUNDS AND METHOD OF ADMINISTERING SAME

Irwin B. Wood, Hopewell, John A. Pankavich, Hamilton Square, and Ronald E. Bambury, Trenton, N.J., assignors to American Cyanamid Company, New York, N.Y., a corporation of Maine
No Drawing. Filed Jan. 26, 1962, Ser. No. 169,084
16 Claims. (Cl. 167—53)

This invention relates to new compositions of matter and methods of administration. More particularly, it relates to substituted styrylpyridinium compounds and a carrier, useful in the control and treatment of helminthiases in warm blooded animals.

The losses due to helminth infections in animals total millions of dollars annually. Therefore, an effective anthelmintic composition at a comparatively low cost is highly desirable in the practice of animal husbandry.

The new compositions of the present invention have as the active ingredient styrylpyridinium compounds of the formula:

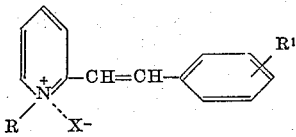

in which R is lower alkyl, $R^1$ is selected from the group consisting of hydrogen and halogen and X is a pharmacologically acceptable anion. The anions may be, for example, chloride, iodide, bromide, $YOSO_3$, wherein Y is alkyl, etc.

We have found that our new compositions of matter are highly effective and possess advantages over currently used anthelmintics. For example, the new compositions of this invention are effective against both adult and larval stages of helminths such as hookworm. This is in contrast to the usual anthelmintics which are effective against adult worms but not against larvae.

The new compositions of the present invention are highly effective when administered in low concentrations in feed. This method of administration provides continuous prophylaxis against helminths causing zoonoses in man (i.e. Ancylostoma braziliense, causative agent of cutaneous larval migrans "creeping eruption"). The majority of currently used anthelmintics in dogs are inactive in feed and must be given, in facts, to fasted animals. Among these anthelmintics are toluene, tetrachlorethylene, N-butyl chloride, bephenium, etc. The present compositions have a wide therapeutic index or margin of safety which permits their continuous use for maximum protection against helminth infection. The present compositions are stable under processing and storage conditions employed in manufacturing both canned meat type and meal type feed. This is in contrast to the majority of anthelmintic compounds which are unstable or otherwise unsuitable for use in feed.

Another advantage of the compositions of the present invention is their compatability with other anthelmintic feed additives such as diethylcarbamazine. The active components of the present composition in combination with diethylcarbamazine as an anthelmintic feed can provide significant prophylactic control of parasites in animals. Furthermore, the compositions of the present invention are palatable to dogs, sheep, swine, rabbits and similar animals. Also, the active components of the compositions of the present invention do not stain feed stuff (feces, animals or environment during any phase of treatment. This is in contrast to some currently used anthelmintics which are intense dyestuffs.

The active component of the new compositions can be present in amounts of from 0.25 mg. to 100 mg. of active ingredient for each kg. of animal body weight in an edible carrier depending upon the animal to be treated and the mode of administration. In medicated feed for repeated continuous daily administration the concentration of active ingredient may range from 5 p.p.m. to not more than 2000 p.p.m. of the total feed or correspondingly greater concentration when only a portion of the medicated feed is used in the daily animal rations. The compositions of the present invention may also consist of the active component in combination with various pharmaceutical carriers, for example, non-toxic liquid solvents, gums, cellulose gums, processed proteins such as soy and peanut, various cereals such as wheat germ, rice flour, potato flour, corn and feed stuffs per se. Also, in addition to using the present compositions in feed, they can be used in capsules, tablets, oblets, pills and similar forms of medication well-known to those skilled in the art of compounding pharmaceutical preparations.

The compositions of the present invention were tested in animals experimentally infected with known numbers of infective helminth larvae. Puppies and young dogs were inoculated with 200-300 larvae of Ancylostoma caninum or A. braziliense. In tests against larval stages, treatment was started one day after infection and was continued once daily in feed for ten days. More effective control may be obtained, however, by a longer treatment period as shown in Table III. The effectiveness of the anthelmintic was determined by comparsion of the number of worms present in treated and untreated control dogs at necropsy.

Against adult worms of 28 days or more, single oral doses, by capsules, and repeated daily doses in feed for seven days were tested. Efficacies of treatments were determined on the basis of pretreatment egg count and the number of worms in treated dogs at necropsy. Standard parasitological and microscopical techniques were used to evaluate the effects of the compounds. The efficacy of a single oral dose of salts of 1-methyl-2-(p-chlorostyryl)-pyridinium compounds against adult A. caninum hookworm in dogs is summarized in the following Table I.

TABLE I

The efficacy of single oral doses of salts of 1-methyl-2-(p-chlorostyryl)-pyridinium compounds against adult A. caninum hookworms in dogs

| Salt | Dose,[a] mg./kg. | Number of dogs | Pre-treatment, eggs/gram of feces (average) | Number of worms at necropsy (average) | | Percent efficacy [b] (average) |
|---|---|---|---|---|---|---|
| | | | | Expected [b] | Actual | |
| I- | 5 | 1 | 5,800 | 116 | 11 | 90 |
| Cl- | 5 | 6 | 5,300 | 106 | 7 | 94 |

[a] In capsule.
[b] Based on experimental data indicating approximately 50 eggs/gram=adult A. caninum.

A great deal of the mortality, morbidity and other pathology brought about by various helminths such as hookworms is caused by severe anemia resulting from the bloodsucking of the immaure hookworm in the pre-patent stages of infection (before positive diagnosis can be made by the presence of eggs in the feces). The currently used anthelmintics are not effective against the immature stages but effective in the mature adult therefore allowing a period of one to two weeks of bloodsucking to occur before worms can be eliminated. (Each worm is estimated to suck 0.1 cc. of blood per day.) However, the effective low doses of the active components of the present invention eliminate the larvae before they begin sucking blood. The medication of the feed of pets and livestock with the present compositions is ideally suited for the prophylactic control of helminth infections which affect man directly and indirectly. The effects of different doses given once daily of 1-methyl-2-(p-chlorostyryl)-pyridinium chloride in feed are summarized below.

TABLE II

*The effect of seven doses, given once daily, of 1-methyl-2-(p-chlorostyryl)-pyridinium chloride in feed*

ANCYLOSTOMA CANINUM

| Dose in feed, mg./kg., body weight | Aprox. percent diet | Type of feed | Number of dogs | Pre-treatment, eggs/gram of feces (average) | Number of worms at necropsy (average) | | Percent efficacy (average) |
|---|---|---|---|---|---|---|---|
| | | | | | Expected [a] | Actual | |
| 2.5 | .01 | Meal | 2 | 7,100 | 142 | 22 | 85 |
| 2.5 | .005 | Canned meat | 6 | 8,300 | 166 | 11 | 93 |
| 2.5 | .005 | Canned meat (autoclaved) | 2 | 2,900 | 58 | 0 | 100 |
| 5 | .02 | Meal | 4 | 8,200 | 164 | 2 | 99 |
| 5 | .01 | Canned meat | 3 | 3,500 | 70 | .3 | 99 |
| 5 | .01 | Canned meat [b] | 4 | 2,900 | 58 | 1 | 98 |
| A. BRAZILIENSE | | | | | | | |
| 5 | .01 | Canned meat | 2 | 2,050 | ---- | 0 | 100 |

[a] Based on 50 eggs/gram=1 adult *A. caninum*.
[b] Processed under mfg. conditions.

To determine the effectiveness of the compositions of the present invention over a longer period of time, repeated doses of 1-methyl-2-(p-chlorostyryl)-pyridinium chloride were administered in feed to dogs with immature and mature *Ancylostoma caninum*. Data are summarized below.

TABLE III

*The effects of repeated doses of 1-methyl-2-(p-chlorostyryl)-pyridinium chloride, administered in feed, on immature and mature* Ancylostoma caninum *in dogs*

| Dose in feed [a] mg./kg., body weight | Number of days treated [b] | Number of dogs | Number of worms at necropsy (average) | Percent efficacy (average) |
|---|---|---|---|---|
| 2.5 | 10 | 6 | 45 | 70 |
| [c] 0 | ---- | 4 | 144 | |
| 2.5 | 30 | 2 | 3 | 96 |
| [c] 0 | ---- | 3 | 103 | |
| 5 | 10 | 8 | 11 | 92 |
| [c] 0 | ---- | 7 | 134 | |
| 5 | 20 | 6 | 0.6 | 99+ |
| [c] 0 | ---- | 3 | 103 | |

[a] Data from meal and meat-type feeds combined, as no significant difference between feeds was present.
[b] Treatment begun one day after inoculation of dogs with *A. caninum*.
[c] Untreated control animals.

In experiments carreid out using various substituted styrylpyridinium compositions it was found that these compositions forming the subject matter of the present invention are active, whereas others are substantially inactive. The following Table IV illustrates the efficacy of the active as well as the inactive compounds when compared to 1-methyl-2-(p-chlorostyryl)-pyridinium chloride as a standard.

TABLE IV

*Comparison of the anthelmintic effectiveness of the styryl-pyridinium analogs against hookworms in dogs*

Active analogs:

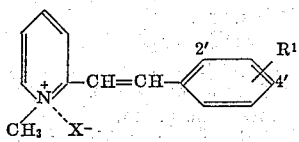

| Substituents | | Efficacy relative to 1-methyl-2-(p-chlorostyryl)-pyridinium chloride | |
|---|---|---|---|
| R¹ | X | Single oral dose | Repeated doses in feed |
| 4'-Cl | I- | 1 | 1 |
| 4'-Cl | CH₃SO₄- | 1 | 1 |
| 2'-Cl | I- | .25 | .5 |
| 4'-Br | CH₃SO₄- | .5 | .75 |
| 4'-Br | Cl- | .5 | .75 |
| H | I- | .1 | .25 |

Inactive analogs: a

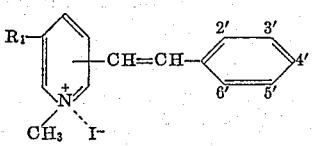

| Substituents | | | | | Efficacy Relative to 1-methyl-2-(p-chlorostyryl)-pyridinium chloride | |
|---|---|---|---|---|---|---|
| Position of styryl group | R₁ | 2' | 4' | 5' | Single oral dose | Repeated doses in feed |
| 4 | H | H | Cl | H | <.1 | <.1 |
| 2 | C₂H₅ | H | Cl | H | <.1 e | <.1 |
| 2 | H | H | N(CH₃)₂ | H | <.25 e* | <.1 |
| 4 | H | Cl | H | Cl | <.1 e | <.1 | a No evidence of activity at highest doses tested (generally, 10× minimal effective dose of 1-methyl-2-(p-chlorostyryl)-pyridinium chloride.
e Emetic.
*Emetic at lower doses also.

The following examples describe in detail the preparation of representative styrylpyridinium compounds found useful in the compositions of the present invention.

EXAMPLE I

To 219.3 grams of 1,2-dimethylpyridinium methylsulfate in 750 ml. of isopropyl alcohol is added 140.6 grams of p-chlorobenzaldehyde and 20 ml. of piperidine. The mixture is brought to the reflux tempearture as rapidly as possible and refluxed for 3 hours. The reaction mixture is then evaporated to one-half the original volume and cooled in an ice bath. The solid is filtered and dried. Further reduction in volume of the mother liquor gives a second crop. Total yield, 213.5 grams of 1-methyl-2-(p-chlorostyryl)-pyridinium methylsulfate, melting point 187–190° C.

EXAMPLE II

To 170 grams of 1-methyl-2-(p-chlorostyryl)-pyridinium methylsulfate is added 350 ml. concentrated hydrochloric acid and the mixture is heated on a steam bath for one hour. To this solution is then added 112.1 grams of barium chloride dissolved in water and the heating is continued for an additional hour. Diatomaceous earth is then added and the mixture is filtered. The solution is evaporated and the solid residue is recrystallized from isopropyl alcohol. Two crops of crystals bring the yield to 228 grams of 1-methyl-2-(p-chlorostyryl)-pyridinium chloride, melting point 220–223° C.

EXAMPLE III

To 21.9 grams of 1,2-dimethylpyridinium methylsulfate in 100 ml. of hot isopropyl alcohol is added 18.5 grams of p-bromobenzaldehyde and 5 ml. of piperidine. The mixture is then refluxed for 3 hours. The mixture is then evaporated to one-half of its original volume and cooled. The solid which forms is filtered and recrystallized from isopropyl alcohol giving 21.0 grams of 1-methyl-2-(p-bromostyryl)-pyridinum methylsulfate, melting point 179–180° C.

EXAMPLE IV

To 12.9 grams of 1-methyl-2-(p-bromostyryl)-pyridinium methylsulfate is added 30 ml. concentrated hydrochloric acid and the mixture is heated on the steam bath for one hour. To this solution is then added 8.1 grams of barium chloride dissolved in water and the mixture is heated for an additional hour. To the mixture is added 50 ml. of alcohol, 10 grams of diatomaceous earth and the mixture is then filtered. The residue is washed with ethanol. The filtrate and washings are combined and evaporated to dryness. The residue is crystallized from isopropyl alcohol, giving 9.5 grams of 1-methyl-2-(p-bromostyryl)-pyridinium chloride, melting point 137–139° C.

EXAMPLE V

To 23.5 grams of 1,2-dimethylpyridinium iodide in 100 ml. of isopropyl alcohol is added 10.6 grams of benzaldehyde and 2 ml. of piperidine. The mixture is refluxed 3 hours and then evaporated to dryness. The solid remaining is recrystallized from 80% aqueous methanol to give 15.0 grams of 1-methyl-2-styrylpyridinium iodide, melting point 220–221° C.

We claim:

1. A method of controlling helminthiases in warm blooded animals by introducing orally into the animals a helminth-toxic quantity of an anthelmintic composition comprising a compound of the formula:

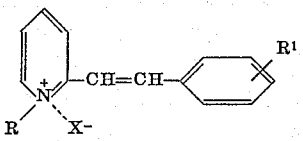

wherein R is lower alkyl, R¹ is selected from the group consisting of hydrogen and halogen and X is a pharmacologically acceptable anion, and an edible carrier.

2. The method of claim 1 in which the compound is 1-methyl-2-(p-chlorostyryl)-pyridinium chloride.
3. The method of claim 1 in which the compound is 1-methyl-2-(p-chlorostyryl)-pyridinium iodide.
4. The method of claim 1 in which the compound is 1-methyl-2-(p-bromostyryl)-pyridinium methylsulfate.
5. The method of claim 1 in which the compound is 1-methyl-2-(p-bromostyryl)-pyridinium chloride.
6. The method of claim 1 in which the compound is 1-methyl-2-styrylpyridinium iodide.
7. The method of claim 1 in which the compound is 1-methyl-2-(p-chlorostyryl)-pyridinium methylsulfate.
8. A method of eradicating helminths in an animal by introducing orally into said animal an anthelmintic composition comprising a carrier and a helminth-toxic quantity in the range of 5 p.p.m. to 2000 p.p.m. of a compound of the formula:

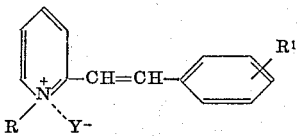

wherein R is lower alkyl, R¹ is selected from the group consisting of hydrogen and halogen and X is a pharmacologically acceptable anion.

9. A method of eradicating parasitic helminths in an animal by introducing orally into its alimentary tract a composition comprising 5 p.p.m. to 2000 p.p.m. of 1-methyl-2-(p-chlorostyryl)-pyridinium chloride in animal feed, said compound being substantially equally dispersed in said feed.

10. An anthelmintic composition comprising a compound of the formula:

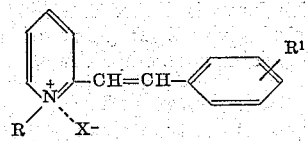

wherein R is lower alkyl, R¹ is selected from the group consisting of hydrogen and halogen and X is a pharmacologically acceptable anion and animal feed as a carrier for said compound, said anthelmintic component being present in from 5 p.p.m. to 2,000 p.p.m.

11. An anthelmintic composition comprising 1-methyl-2-(p-chlorostyryl)-pyridinium chloride and an animal feed as a carrier, said anthelmintic component being present in from 5 p.p.m. to 2,000 p.p.m.

12. An anthelmintic composition comprising 1-methyl-2-(p-chlorostyryl)-pyridinium methylsulfate and an animal feed as a carrier, said anthelmintic component being present in from 5 p.p.m. to 2,000 p.p.m.

13. An anthelmintic composition comprising 1-methyl-2-(p-bromostyryl)-pyridinium methylsulfate and an animal feed as a carrier, said anthelmintic component being present in from 5 p.p.m. to 2,000 p.p.m.

14. An anthelmintic composition comprising 1-methyl-2-styrylpyridinium iodide and an animal feed as a carrier, said anthelmintic component being present in from 5 p.p.m. to 2,000 p.p.m.

15. An anthelmintic composition comprising 1-methyl-2-(o-chlorostyryl)-pyridinium iodide and an animal feed as a carrier, said anthelmintic component being present in from 5 p.p.m. to 2,000 p.p.m.

16. An anthelmintic composition comprising an animal feed containing from 5 p.p.m. to 2,000 p.p.m. of 1-methyl-2-(p-chlorostyryl)-pyridinium chloride.

References Cited by the Examiner
UNITED STATES PATENTS
2,742,463   4/56   Finkelstein _____ 260—240

OTHER REFERENCES
Chemical Abstract Subject, Index Volume 53, 1959, page 2356S (col. 2).

LEWIS GOTTS, *Primary Examiner.*
MORRIS O. WOLK, FRANK CACCIAPAGLIA, JR.,
*Examiners.*